June 23, 1936.  C. A. OTTO  2,045,332
TEMPERATURE REGULATOR
Filed July 13, 1933  2 Sheets-Sheet 1
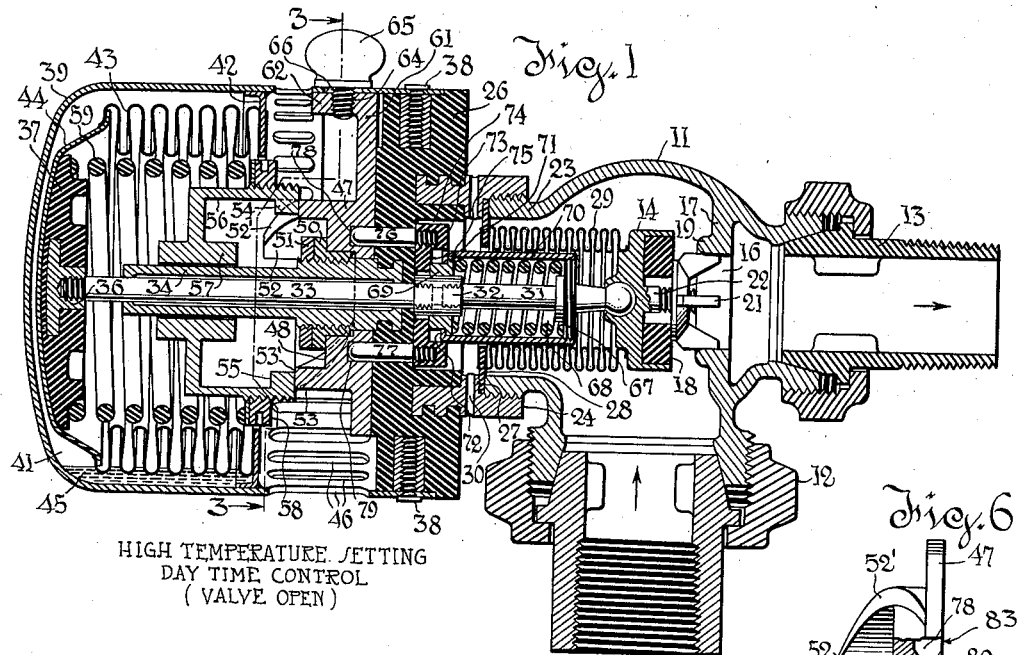
HIGH TEMPERATURE SETTING
DAY TIME CONTROL
(VALVE OPEN)
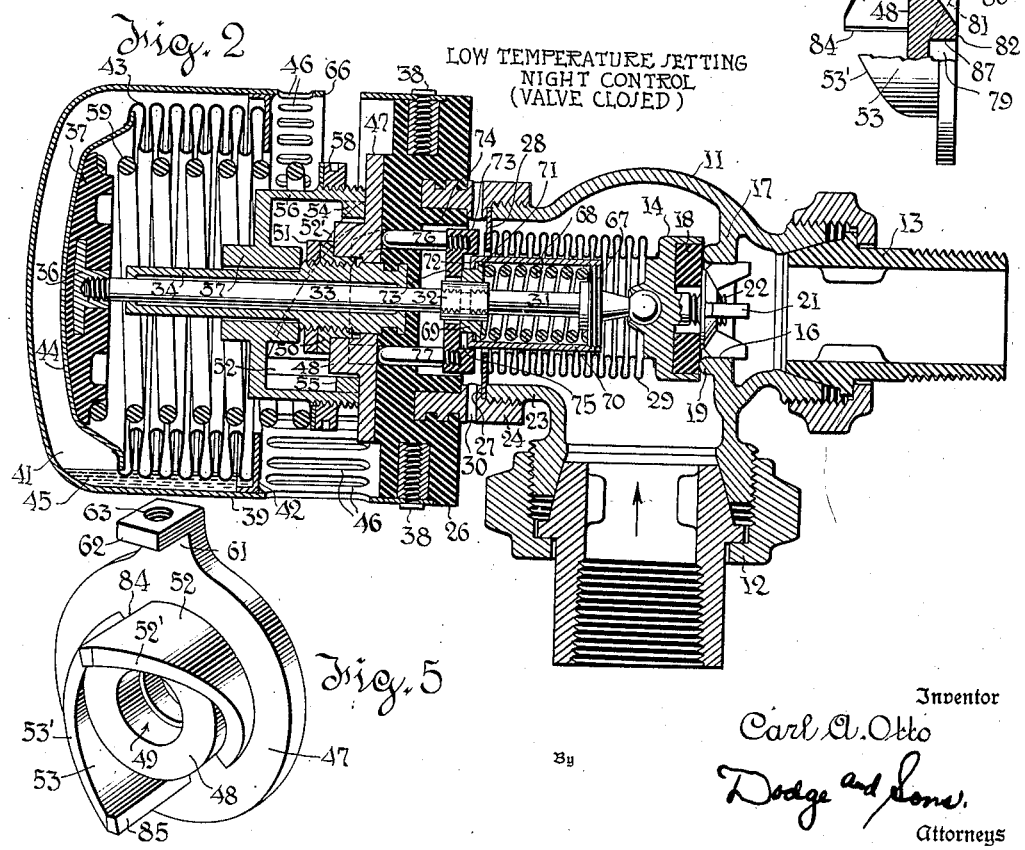
LOW TEMPERATURE SETTING
NIGHT CONTROL
(VALVE CLOSED)
Inventor
Carl A. Otto
By
Dodge and Sons.
Attorneys

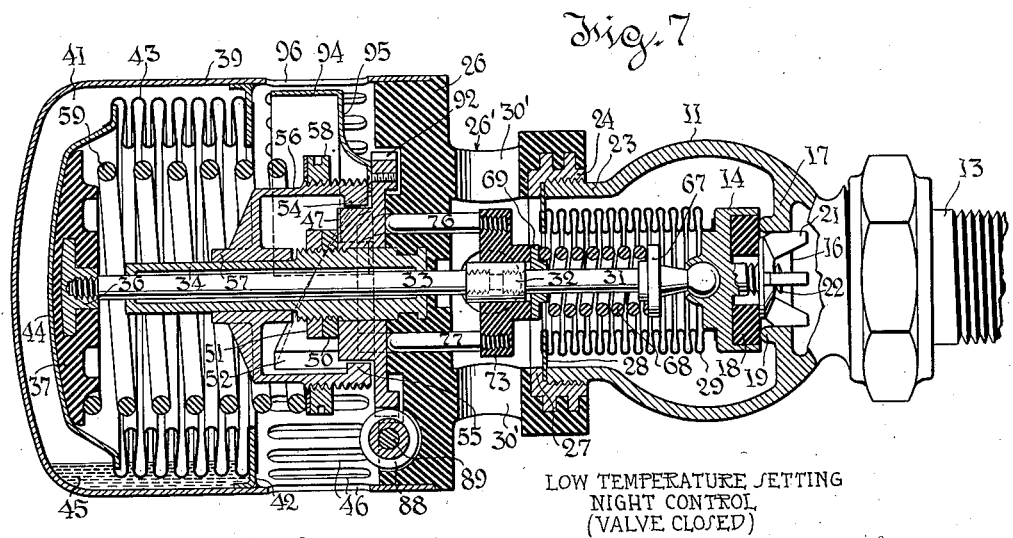
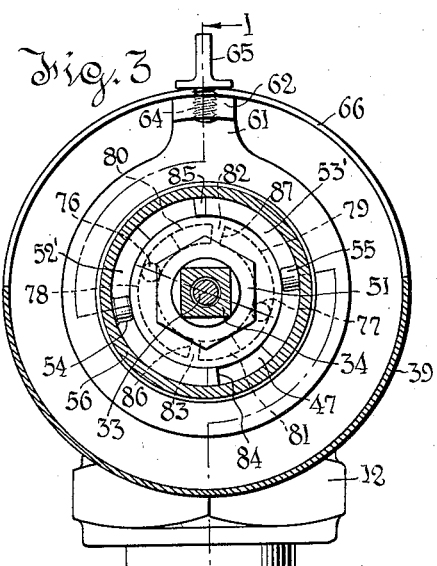
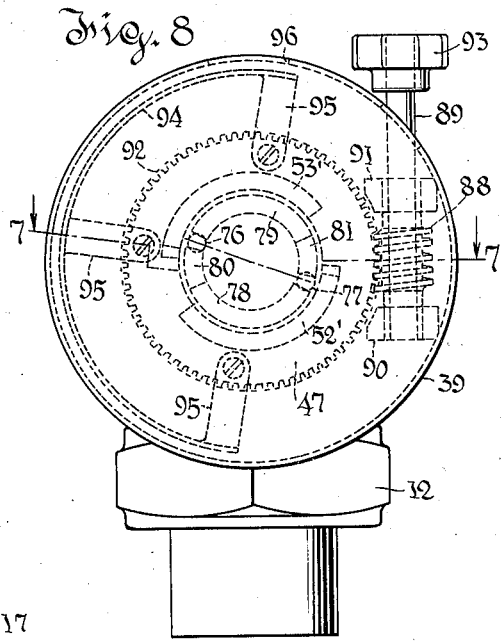
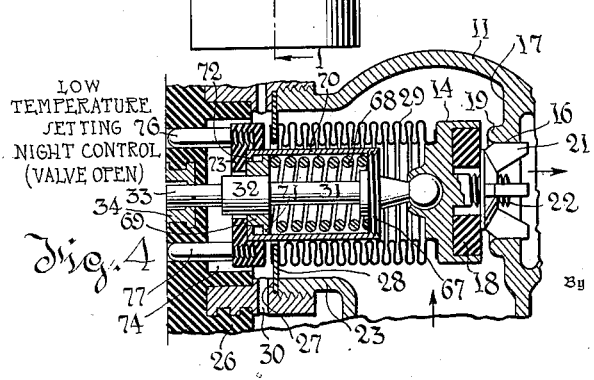

Patented June 23, 1936

2,045,332

UNITED STATES PATENT OFFICE 2,045,332

TEMPERATURE REGULATOR

Carl A. Otto, Milwaukee, Wis., assignor to Johnson Service Company, Milwaukee, Wis., a corporation of Wisconsin Application July 13, 1933, Serial No. 680,300

22 Claims. (Cl. 236—47)

The present invention pertains to temperature regulation and control, and particularly to automatic regulating devices for this purpose.

Primarily, the object of the invention is to provide an efficient temperature regulating device, wherein the temperature controller, such as a radiator valve, is operated by thermally responsive means which may be set to maintain a desired normal or relatively high room temperature, or the device may be adjusted to a low temperature setting to shut off the heat controller entirely so that it will operate again only in the event the room temperature falls below a predetermined minimum.

The invention relates specifically to automatic radiator valves of the direct control type, that is, radiator valve devices wherein the thermally responsive means for actuating the valve and the adjusting means therefor are mounted directly on the valve body. It is proposed to furnish a dual temperature valve of this type provided with readily manipulated means whereby the device may be adjusted to a high temperature or day time setting to maintain any desired normal room temperature, or, if desired, the valve may be shut off entirely to provide a low temperature or night setting with the thermally responsive means still in control so as to permit the valve to open should the room temperature drop below a predetermined minimum. In this manner, the predetermined minimum room temperature is maintained. It is contemplated that, when set for low temperature operation, the opening movement of the valve shall be reduced so as to restrict the flow of heating fluid; also that the device may be adjusted so as to vary the predetermined minimum temperature below which the valve opens automatically.

A further feature is the provision of a single adjusting means which may be operated readily to provide either low or high level operation of the heat regulator. Other features are the simplicity and ruggedness of design of the heat regulator; also the special provisions made to prevent such radiation and conduction of heat from the valve and valve body to the thermally responsive means as might interfere with efficient control of the latter by the room temperature.

In the accompanying drawings which illustrate several practical embodiments of the invention:—

Fig. 1 is a longitudinal section taken on line 1—1 of Fig. 3, showing the normal, day time or high setting of the device, with the valve open to permit passage of the heating fluid to the radiator;

Fig. 2 is a similar view of the regulator adjusted to night or low temperature setting, with the valve closed;

Fig. 3 is a vertical section taken on line 3—3 of Fig. 1;

Fig. 4 is a fragmentary section similar to Fig. 2, but with the valve open;

Fig. 5 is a perspective of the manually adjustable double cam for setting the device either for high or low temperature operation;

Fig. 6 is an edge view of the cam broken away partly to show the several cam surfaces;

Fig. 7 is a longitudinal section of a modified form of the device taken on line 7—7 of Fig. 8, with the regulator adjusted to night or low temperature setting and the valve closed, this corresponding to the condition of the parts of the preferred form of the device as shown in Fig. 2; and Fig. 8 is an outer end elevation of the modified structure.

Referring to the preferred construction of Figs. 1 to 6, 11 indicates a valve casing, 12 a union coupling leading from the heating fluid supply, and 13 an outlet coupling adapted for connection to a radiator or the like (not shown).

A valve 14 of the conventional reciprocatory type is mounted for movement in casing 11 to control passage of heating fluid through a port 16 provided in partition 17 formed in the casing. A gasket 18 is secured in the outer face of valve 14 for engagement with the raised valve seat 19. Member 21, adjustably secured on a threaded extension 22 of the valve, serves to guide the latter and also to secure gasket 18 in place.

A threaded, hollow extension 23 on the outer side of valve casing 11 carries a bonnet structure which supports the automatic thermostatic means and the manual adjusting means for controlling the position of valve 14 with reference to its seat. This bonnet structure comprises an internally-threaded, metal collar 24 secured to casing extension 23 and a disk-like member 26 of insulation material molded onto the collar so as to close the outer end thereof.

Collar 24 is formed with an internal-annular shoulder 27 between which and the end of casing extension 23 is tightly clamped a metal annulus 28. Located in valve casing 11 is a flexible bellows 29, the outer end of which is secured about the inner edge of annulus 28. The inner end of the bellows is attached to valve 14. Since the connections of bellows 29 with the annulus and the valve are both fluid-tight, preferably soldered, there is thus provided a packless joint which entirely prevents leakage of heating fluid from the valve casing at this point, but permits free movement of valve 14 toward and away from its seat at all times. An annular series of openings 30 in collar 24 provides for ventilation and aids in preventing the undesirable transmission of heat from valve 14 and its casing 11 to the thermal unit later described.

A stem 31 extends from valve 14 and is removably connected at its outer end by an insulation member 32 to a valve actuating rod 33. Rod 33 extends freely through an opening in insulation member 26 and a tubular guide member 34 supported rigidly at its inner end in insulation member 26. The outer projecting end of rod 33 has threaded engagement with a metal socket piece 36 embedded in a piston head 37 of insulation material.

Telescoping with bonnet member 26 and detachably secured thereto by screws 38 is a shell 39. The outer end portion of this shell is imperforate and forms the outside walls of a thermic cell or thermostatic head 41. An annular flange 42 is fixed on the inside of shell 39. The inner end of a flexible, corrugated bellows 43 is attached to the inner circumference of this fixed flange, while the outer end of bellows 43 is secured to the periphery of a bellows disk 44 bearing against piston head 37. Located in thermic cell 41, as indicated at 45 in Fig. 1, is a quantity of volatile liquid, such, for example, as ethyl chloride. The connections between bellows 43 and flange 42 and bellows disk 44 are made fluid-tight, so as to prevent leakage from the thermic cell of the liquid or the gases formed thereby. An annular series of slots 46 in casing 39 permits free circulation of the surrounding air therethrough and into contact with the inner surfaces of thermic cell 41.

Mounted for oscillatory movement on guide member 34 adjacent bonnet 26 is a cam member 47 having an annular hub portion 48 with an opening 49 therethrough. Guide member 34 is threaded to receive a nut 50 and a lock nut 51 which coact with hub portion 48 to prevent longitudinal movement of cam 47 on the guide member. The outer face of cam 47 is formed with a pair of diametrically-opposed, arcuate cam portions 52, 53 having camming surfaces 52', 53', respectively.

Cam portions 52, 53, during high temperature setting of the device, as appears in Fig. 1, engage diametrically opposed lugs 54, 55, respectively, formed on the inner edge of a cup-shaped member 56. The end wall of member 56 is provided with an extended tubular bearing 57 which supports the cup-shaped member for lengthwise adjustment on guide member 34 by means of cam 47, as explained later. Guide member 34 and the passage through bearing 57 are of rectangular or other suitable cross section to prevent rotation of member 56. At its inner end cup-shaped member 56 is threaded externally to receive a ring nut 58 between which and piston head 37 a coil spring 59 is arranged under tension.

Thus, since cup-shaped member 56 bears against cam 47 and the latter is held against longitudinal movement, spring 59 continuously exerts an outward pressure against piston head 37 tending through the operative connections described to open valve 14. Operating in opposition to the force of spring 59, and tending to close valve 14, is the vapor pressure present in thermic cell 41 when the room temperature exceeds the boiling point of the volatile liquid 45.

As long as the room temperature remains relatively low, so that there is insufficient vapor pressure to overcome the resistance of spring 59, the latter will hold valve 14 open (as appears in Fig. 1) and permit heating fluid to flow to the radiator, thereby raising the room temperature. This results in increasing the vapor pressure and, when this pressure becomes sufficient to overcome the resistance of spring 59, bellows disk 44 will move inwardly and force piston head 37 to close valve 14 through the connections described. Thus, flow of heating fluid through valve casing 11 will be cut off until the room temperature drops sufficiently again to cause operation of the device to open the valve.

Regulation of the normal or daytime room temperature is secured by proper adjustment of the tension of spring 59. This is accomplished by rotating cam 47 in either a clockwise or a counter-clockwise direction as it appears in Fig. 3. For this purpose cam 47 is provided with a radial operating arm 61 having a bent portion 62 adjacent the inner surface of casing 39. Arm portion 62 is formed with a threaded opening 63 to receive the threaded shank 64 of an operating knob 65 located outside of casing 39 and having its shank extending through a segmental slot 66 therein.

Referring to Figs. 1 and 3, which show an intermediate high or daytime setting of the regulator, it will be noted that the position to which cam 47 has been rotated is such that lugs 54, 55 are in engagement with cam surfaces 52', 53' intermediate their ends, and thus cup-shaped member 56 has been forced outwardly to compress spring 59. Hence, spring 59 is maintained under a definite tension which will cause the device to operate to maintain a predetermined, relatively high, room temperature. If a still higher temperature is desired, cam 47 is turned clockwise to the desired extent by means of knob 65. This causes cam portions 52, 53 to force member 56 outwardly by means of lugs 54, 55 and thus further compress spring 59. The resistance of spring 59 being increased, a higher normal room temperature is required to cause the thermic cell to overcome the spring and close valve 14.

Should a lower normal room temperature be desired, counter-clockwise movement of knob 63 (Fig. 3) will move the lower portions of cam surfaces 52', 53' opposite lugs 54, 55 and thereby permit spring 59 to expand. The tension of the spring having been reduced, a lower room temperature will cause sufficient vapor pressure in thermic cell or motor 41 to close valve 14. Location of the thermostatic head 41 to one side of valve casing 11 prevents heated air rising from the valve casing, interfering with proper operation of the thermally responsive means. After calibrating the device, suitable graduations or other markings may be provided on the exterior of shell 39 adjacent slot 66 so as to indicate the proper position to which knob 65 should be moved in order to maintain a desired normal, room temperature or to provide the low temperature setting described below.

The low temperature or night setting means for manually closing valve 14 will now be described. Adjoining valve 14 the valve stem 31 is formed with an annular, externally threaded flange 67 upon which bears the inner end of a light coil spring 68 surrounding the valve stem. The outer end of spring 68 bears against a collar 69 slidably mounted on insulation piece 32. Surrounding spring 68 and collar 69 is a cylinder 70 having threaded connection at its inner end with flange 67 on the valve stem. An annular flange 71 on collar 69 and a coacting annular flange 72 on the outer end of cylinder 70 serve properly to guide these parts in the operation of the device and to prevent their separation.

A disk 73 of insulation material is located for axial movement in a recess 74 formed in the inner face of insulation member 26. Disk 73 is centrally perforated to permit free passage of connecting piece 32 and on its inner face is recessed at 75 to receive collar 69 and cylinder 70. Disk 73 has mounted on its outer face a pair of diametrically opposed pins 76, 77 which extend through holes provided for the purpose in bonnet member 26.

On its inner face cam 47, as shown most clearly in Figs. 3 and 6, is formed with a pair of diametrically opposed, arcuate grooves 78, 79. These grooves, as appears from Fig. 3, are formed on a smaller diameter than are segmental cam portions 52, 53 and extend into hub portion 49 of cam 47. Pins 76, 77 normally project into grooves 78, 79, respectively, opposite the flat bottom surfaces of the grooves, as shown in Fig. 1.

The opposite ends of grooves 78, 79 are provided, respectively, with inclined cam surfaces 80, 81 which are adapted, upon sufficient rotation of cam 47 in a counterclockwise direction, to engage pins 76, 77 and force them inwardly to the low temperature setting, valve closed position of Fig. 2. This moves disk 73, collar 69, and spring 68 inwardly to close valve 14. As a result, spring 68 is compressed somewhat so that the tension thereof maintains the valve tightly, but yieldably, against its seat 19. The parts are so proportioned that at this time pins 76, 77 engage flat portions 82, 83 of cam 47 between grooves 78, 79 and flat ends 84, 85 of cam portions 52, 53 abut lugs 54, 55 to limit rotation of cam 47 in a counter-clockwise direction. Rotation of the cam in a clockwise direction, during high temperature or daytime setting of the device, is limited by engagement of the flat ends 86, 87 of cam grooves 78, 79 with pins 76, 77.

In operation, it will be clear that, as explained, adjustment of knob 65 to bring lugs 54, 55 into engagement with cam surfaces 52', 53' will set the device so that valve 14 will be operated automatically to maintain a definite, relatively high room temperature corresponding to the position of lugs 54, 55 on the cam surfaces. As shown in Fig. 3, arcuate cam portions 52, 53 and arcuate cam grooves 78, 79 are angularly arranged on cam 47 so that during any normal temperature setting of lugs 54, 55 on cam surfaces 52', 53', pins 76, 77 are not engaged by cam surfaces 80, 81. Hence, these pins and disk 73 to which they are attached are free to move to their outermost position of Fig. 1 and thus do not interfere with normal, automatic operation of the regulator.

However, when knob 65 is swung counter-clockwise toward sub-normal setting position, lugs 54, 55 move out of contact with cam surfaces 52', 53' into engagement with the flat surface of cam disk 47, and cam surfaces 80, 81 engage pins 76, 77 to move the parts to the low temperature setting, valve closed position of Fig. 2, as already described. Thus, the valve is held closed yieldably by the tension of spring 68, but is adapted to open automatically to a limited extent to raise the room temperature should it fall below a predetermined minimum.

This minimum temperature setting point is determined by the relationship between the strength of springs 59 and 68 and the vapor pressure in thermic cell 41 when the parts are in the position of Fig. 2. Spring 68 is lighter than spring 59 so that the latter tends to open valve 14, but the several parts of the device are so proportioned and adjusted that the presence of vapor pressure in thermic cell 41 sufficient to urge the valve toward closed position, together with the expansive force of spring 68, will be sufficient to overcome spring 59 and hold the valve closed.

Ethyl chloride has a boiling temperature of 54° F. If this liquid is used, vapor pressure will accumulate in cell 41 when the room temperature rises above 54° F., and, hence, valve 14 will remain closed. However, at 54° F. or lower, no pressure will be exerted by the vapor tension in cell 41 and the expansive tendency of spring 59 will be sufficient to open valve 14 against the closing pressure of spring 68. This condition is shown in Fig. 4, wherein stem 31 and valve 14 have been moved outwardly by spring 59 so as further to compress spring 68 and bring the outer end of cylinder 70 against disk 73. Disk 73 being held in the innermost position of Figs. 2 and 3 by cam 47, cylinder 70 thus restricts the opening of valve 14 to less than the normal opening of Fig. 1, since only a limited flow of heating fluid is necessary to maintain the desired minimum room temperature. As soon as this minimum is reached, vapor pressure in cell 41 and spring 68 serve to close the valve again.

Obviously, if any volatile liquid having a boiling point either higher or lower than that of ethyl chloride were used, the predetermined minimum or low temperature below which the regulator would operate to open the valve would be different. It is also possible to vary the low temperature setting point by providing for a change in the tension of spring 59 as compared with the tension of spring 68 when the parts are in the positions of Fig. 2. This may be effected by adjustment of ring nut 58 or by a low setting adjustment of the regulator wherein pins 76, 77 remain in contact with cam surfaces 80, 81, thereby increasing the difference in the strength of the two springs 59 and 68. As a result, spring 59 will still open the valve automatically below a predetermined low temperature, but this temperature will be relatively higher, since such a temperature is necessary to produce the greater vapor pressure required to hold valve 14 closed against the increased tendency of spring 59 to open it.

The modified regulator of Figs. 7 and 8 is constructed and operates quite similarly to that of Figs. 1 to 6, and, therefore, the various corresponding parts are similarly numbered. There is no change in the construction of the thermostatic head 41 which, together with spring 59, automatically controls operation of valve 14 to maintain any desired normal room temperature for which the device may be set, as already described. Adjusting cam 47 is the same, except that the operating lever has been replaced by a worm drive in order to provide for more accurate adjustment of the parts and to maintain them securely in adjusted position. For this purpose bonnet member 26 is recessed to accommodate a worm 88 secured on a shaft 89 arranged in suitable bearings 90, 91 on member 26. Worm 88 meshes with teeth 92 on the periphery of cam 47. Shaft 89 projects through an opening in shell 39 and has an operating knob 93 secured to its outer end.

As shown in Figs. 7 and 8, knob 93 has been turned as far as it will go in one direction so that the regulator is adjusted to low temperature setting or night control with valve 14 closed. In order to indicate the various positions to which the regulator may be adjusted, an arcuate indicator strip 94 is supported on cam 47 by a series of arms 95 screwed thereto. The outer face of strip 94 is provided with suitable graduations or other indicia which may be observed through opening 96 in shell 39. Bonnet insulating piece 26 is formed with an extended neck 26' and an annular series of large openings 30' which afford additional insulation and ventilation of the parts.

The yieldable means for maintaining valve 14 closed at low temperature setting are modified somewhat. Spring 68 bears on valve stem flange 67 at its inner end and against sliding collar 69 at its outer end, but collar 69 is mounted on stem 31 inside of connecting piece 32. When disk 73 has been moved to its innermost or low temperature position of Fig. 7 by operation of knob 93, disk 73 coacts with collar 69 to hold spring 68 in partially compressed condition and valve 14 yieldably closed. Should the room temperature drop below the predetermined minimum, and hence there be insufficient vapor pressure in thermic cell 41 to assist in holding the valve closed, spring 59 will overcome spring 68 and open valve 14, this being permitted by the further compression of spring 68. In this construction, contact of the convolutions of spring 68 with each other serves to limit the opening of valve 14 to less than normal. Upon attainment of the minimum low temperature, spring 68 and the resulting vapor pressure in cell 41 function to close the valve again.

What is claimed is:—

1. In a device of the type described, a valve casing; a valve in said casing; a thermally responsive motor operatively connected to said valve for actuation thereof in response to temperature changes, said valve being adapted for closing movement upon an increase in temperature; spring means tending to open the valve; manual means for closing the valve in opposition to the spring means; and additional spring means interposed between the valve and the manual means and adapted to be partially compressed upon operation of the manual means to close the valve yieldably, the strength of said first-mentioned spring means being such as to permit the combined power of the additional spring means and vapor pressure in the thermal motor to maintain the valve in manually closed position, but sufficient to open the valve against the resistance of the additional spring means upon a reduction in the vapor pressure in the motor.

2. In a device of the type described, a valve casing; a valve in said casing; a thermally responsive motor operatively connected to said valve for operation thereof in response to temperature changes, said valve being adapted for closing movement upon an increase in temperature; spring means tending to open the valve; manual means for closing the valve in opposition to the spring means; and additional spring means adapted to be stressed upon operation of the manual means to close the valve yieldably, the strength of said first-mentioned spring means being such as to permit the combined power of the additional spring means and vapor pressure in the thermal motor to maintain the valve in manually closed position, but sufficient to overcome the additional spring means and open the valve upon a reduction in the vapor pressure.

3. In a device of the type described, a valve casing; a valve in said casing adapted for operation either at a relatively high, normal temperature setting or at a relatively low sub-normal temperature setting; a thermally responsive motor operatively connected to said valve for actuation thereof in response to temperature changes, said valve being adapted for closing movement upon an increase in temperature; resilient means constantly tending to open the valve and adjustable to vary the high temperature setting of the device; and manually controlled means for closing the valve in opposition to said resilient means to effect a low or sub-normal setting of the device, the resilient means being of sufficient strength to open the valve only below a predetermined low temperature when closed by the manually controlled means.

4. A device of the type described in claim 3 further characterized that means are included for varying the predetermined low temperature below which the manually closed valve will open automatically.

5. In a device of the character described, a valve casing; a valve in said casing; a thermally responsive motor containing a motive fluid and operatively connected to said valve for actuation thereof in response to temperature changes, said valve being adapted for closing movement upon an increase in temperature; spring means tending to open the valve; and manually controlled means compressible for closing the valve in opposition to the spring means, said spring means being adapted to further compress said manually controlled means and open the valve, when closed by the manually controlled means, below a selected low temperature, but permitting the valve to remain closed at higher temperatures.

6. In a device of the character described, a valve casing; a valve in said casing; a thermally responsive motor operatively connected to said valve for actuation thereof in reponse to temperature changes, said valve being adapted for closing movement upon an increase in temperature; resilient means constantly tending to open the valve; and manual means operatively connected to the valve for closing the valve in opposition to the resilient means, the connection between the valve and said manual means including additional resilient means which are stressed upon operation of the manual means to close the valve, said first-mentioned resilient means being of proper strength to open the manually closed valve against the resistance of said additional resilient means only below a predetermined low temperature.

7. In a device of the type described, thermally responsive means; a heat controller operatively connected therewith to be actuated thereby in response to changes in temperature, said heat controller being movable between an operative, temperature increasing position and an inoperative, temperature reducing position, and adapted for movement toward inoperative position upon an increase in temperature; resilient means urging the heat controller toward operative position; and manual means compressible for securing the heat controller in inoperative position in opposition to the resilient means, said resilient means being of proper strength to further compress said manual means and move the heat controller to operative position only below a predetermined low temperature when held in its inoperative position by the manual means.

8. In a device of the type described, a valve casing; a reciprocating valve in said casing; a thermally responsive motor containing a volatile liquid and operatively connected to said valve for actuation thereof in response to temperature changes, said valve being adapted for closing movement upon an increase in temperature; a relatively heavy spring constantly urging the valve toward open position; manual means having operative connection with the valve for closing the valve in opposition to said spring; and a second, relatively light spring interposed in said operative connection between the valve and the manual means and adapted to be compressed when the valve is closed by the manual means, the strength of the first-mentioned spring being sufficient to overcome the resistance of the second-mentioned spring to open the manually closed valve only when the temperature of said liquid reaches or falls below its boiling point.

9. In a device of the type described, a valve casing; a reciprocatory valve in said casing; an expansible thermic motor operatively connected to the valve for actuation thereof in response to temperature changes, said valve being adapted for closing movement upon expansion of the motor; a spring constantly urging the valve toward open position; manual means having operative connection with the valve for closing the valve in opposition to said spring; and a second spring interposed in said operative connection between the valve and the manual means and adapted to be compressed when the valve is closed by the manual means, the strength of the first-mentioned spring being sufficient to overcome the second-mentioned spring and open the manually closed valve only when the temperature of the surrounding atmosphere is too low to cause the thermic motor to exert a closing force upon the valve.

10. In a device of the character described, a valve casing; a valve in said casing; a thermally responsive motor operatively connected to said valve for actuation thereof in response to temperature changes, said valve being adapted for closing movement upon an increase in temperature; resilient means constantly tending to open the valve; and manual means adapted for operation either to increase the tension of said resilient means to effect a high temperature, normal setting of the device or to yieldably urge the valve toward closed position in opposition to the resilient means to provide a low temperature, subnormal setting of the device.

11. In a device of the type described, a valve casing; a valve therein; a thermal motor supported by the valve casing; operating means connecting the motor and the valve for actuation of the valve in response to temperature changes, said valve being adapted for closing movement upon an increase in temperature; spring means tending constantly to open the valve; a second spring means adapted upon manual actuation normally to close the valve in opposition to the first-mentioned spring means; and a single member adapted for manual operation in one direction to increase the tension of the first-mentioned spring means and thereby raise the temperature setting of the thermal motor, and in another direction to actuate the second-mentioned spring means and yieldably close the valve, the first-mentioned spring means being of sufficient strength to open the manually closed valve only below a predetermined low temperature.

12. The combination described in claim 11, further characterized in that the first-mentioned and the second-mentioned spring means are spaced lengthwise of and surround the valve operating means, and that the manual operating member is mounted rotatively between the first and second-mentioned spring means for successive actuation thereof.

13. The combination described in claim 11 further characterized in that each of the spring means includes a coil spring surrounding the valve operating means and that the manual operating member is rotatably mounted on the valve operating means between said springs and is in the form of a double-faced cam, one face of which coacts with the first-mentioned spring means and the other face with the second-mentioned spring means.

14. The combination described in claim 11 further characterized in that the manual operating member is in the form of a disc rotatably mounted between the first-mentioned and the second-mentioned spring means, and that said disc is formed on one face with a projecting cam surface for engagement with one of said spring means and on the other face with a depressed cam surface for engagement with the other of said spring devices.

15. The combination described in claim 11 further characterized in that the second-mentioned spring means comprises a coil spring confined between the valve and slidable means surrounding the valve operating means, and that the manual operating member is provided with a cam surface on one face thereof adapted to engage the slidable means and yieldably close the valve.

16. The combination described in claim 11 further characterized in that the second-mentioned spring means comprises a coil spring confined between a shoulder on the valve operating means and slidable means surrounding the valve operating means, said slidable means carrying pins projecting freely outside of the valve casing, and that the manual operating member is formed with cam surfaces on one face thereof adapted to engage said pins and yieldably close the valve.

17. The combination described in claim 11 further characterized in that the second-mentioned spring means comprises a slidable collar on the valve operating means, a cylinder threaded at one end onto a threaded annular flange on the valve operating means and telescoping at its other end with said collar, said collar and cylinder being formed with annular flanges to prevent their separation, and a coil spring in the cylinder between the collar and said flange.

18. In a device of the type described, a valve casing; a valve therein; a thermally responsive motor operatively connected to the valve for actuation thereof in response to temperature changes, said valve being adapted for closing movement upon an increase in temperature; spring means constantly tending to open the valve; manual means for closing the valve in opposition to the spring means, but permitting the spring means to open the manually closed valve below a predetermined temperature; and means preventing the spring means from opening the manually closed valve to its normal full extent.

19. In a device of the type described, a valve casing, a valve in said casing adapted for operation either at a relatively high, normal temperature setting or at a relatively low, sub-normal temperature setting; a thermally responsive motor operatively connected to said valve for actuation thereof in response to temperature changes, said valve being adapted for closing movement upon an increase in temperature; resilient means constantly tending to open said valve and adjustable to vary the high temperature setting of the device; and manually controlled means for closing the valve in opposition to said resilient means to effect low or sub-normal setting of the device, the resilient means being adapted to open the valve only at sub-normal temperatures when closed by the manually controlled means.

20. The combination of a thermally responsive motor; a heat controller operatively connected therewith to be actuated thereby in response to changes in temperature, said controller being movable between open and closed positions; adjusting means for varying the effect of the motor on the controller; and spring means adapted for actuation by the adjusting means to secure the heat controller yieldably in closed position, but permitting it to overcome said spring means and open automatically should the room temperature drop to a sub-normal level.

21. In a device of the type described, a valve casing; a valve in said casing; a thermally responsive motor operatively connected to said valve for operation thereof in response to temperature changes, said valve being adapted for closing movement upon an increase in temperature; spring means tending to open the valve; manual means for closing the valve in opposition to the spring means; and additional spring means adapted to be stressed upon operation of the manual means to close the valve yieldably, the strength of said first-mentioned spring means being such as to permit the combined power of the additional spring means and vapor pressure, at or above a selected minimum, present in the thermal motor, to maintain the valve in manually closed position, but sufficient to open the valve against the resistance of the additional spring means when the vapor pressure in the motor drops below said minimum.

22. In a device of the type described, a valve casing; a valve in said casing; a thermally responsive motor operatively connected to said valve for operation thereof in response to temperature changes, said valve being adapted for closing movement upon an increase in temperature; resilient means tending to open the valve; manual means for closing the valve in opposition to the resilient means; and additional resilient means adapted to be stressed upon operation of the manual means to close the valve yieldably, the strength of said first-mentioned resilient means being such as to permit the combined power of the additional resilient means and any force exerted by the thermal motor to maintain the valve in manually closed position, but sufficient to overcome the additional resilient means and open the valve upon a reduction in the force exerted by the thermal motor.

CARL A. OTTO.